US006252855B1

(12) United States Patent
Langley

(10) Patent No.: US 6,252,855 B1
(45) Date of Patent: Jun. 26, 2001

(54) METHOD AND APPARATUS FOR IDENTIFYING A MAXIMUM FRAME SIZE TO MAINTAIN DELAY AT OR BELOW AN ACCEPTABLE LEVEL

(75) Inventor: David Langley, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/996,115

(22) Filed: Dec. 22, 1997

(51) Int. Cl.$^7$ ....................................... H04J 3/24
(52) U.S. Cl. ............................. 370/252; 370/471
(58) Field of Search ................................ 370/230, 231, 370/232, 235, 236, 229, 252, 253, 470, 471, 474

(56) References Cited

U.S. PATENT DOCUMENTS

| | | | |
|---|---|---|---|
| 4,771,391 | * | 9/1988 | Blasbalg ................................ 370/470 |
| 5,513,172 | * | 4/1996 | Shikama et al. ...................... 370/231 |
| 5,541,922 | * | 7/1996 | Pyhalammi ........................... 370/470 |
| 5,734,654 | * | 3/1998 | Shirai et al. .......................... 370/401 |

* cited by examiner

Primary Examiner—Wellington Chin
Assistant Examiner—Frank Duong
(74) Attorney, Agent, or Firm—Charles E. Gotlieb

(57) ABSTRACT

A method and apparatus negotiates a maximum frame size to be used over a frame relay network. A local maximum frame size is identified by a first endpoint device of a frame relay network so that other frames sent and received using that size will not cause other frames sent by the network device to be sent a period of time exceeding an acceptable delay after the other frames are received. The acceptable delay is the lowest acceptable delay among originators and recipients of frames that use the endpoint device. The frame size identified is transmitted to other endpoint devices that can communicate with the first endpoint device. These other endpoint devices identify acceptable delays that correspond to the originators and recipients of such endpoint devices. The other endpoint devices transmit their acceptable delays to the first endpoint device. If the first endpoint device has a payload of information to send to any of the other endpoint devices, the first endpoint device sends the payload using frame sizes not larger than either of the frame size identified by the first endpoint device and the frame size received from the endpoint device to which the frame will be transmitted.

34 Claims, 3 Drawing Sheets

METHOD AND APPARATUS FOR IDENTIFYING A MAXIMUM FRAME SIZE TO MAINTAIN DELAY AT OR BELOW AN ACCEPTABLE LEVEL

CROSS REFERENCE TO RELATED APPLICATIONS

The subject matter of this application is related to the subject matter of application Ser. No. 08/672,674 entitled, "Autosensing LMI Protocols in Frame Relay Networks" filed on Jun. 28, 1996 by Shankar Natarajan and Gregory Fowler having the same assignee as this application and incorporated herein by reference in its entirety.

FIELD OF THE INVENTION

The present invention is related to computer networks and more specifically to network management software in a computer network.

BACKGROUND OF THE INVENTION

Computer networks such as frame relay or X.25 networks transmit binary information from an originator to one or more recipients. An endpoint device such as a router receives the information from the originator and partitions the information into chunks of information known as frames. During the partitioning process, header information such as routing information is added to the frame based upon instructions from the originator. The router can partition the information into any size frames it desires, subject to a maximum allowable frame size for the network. The endpoint device then queues the frames and transmits them into the network one at a time.

The network uses the routing information to bring the information sent by the originator to a destination endpoint device that accepts information for a specified recipient. The destination endpoint device then reassembles the information from the frames and passes the information to the recipient. Each endpoint device is any device that can supply and/or receive information from the network, such as a conventional router with a frame relay interface or a conventional computer with a conventional frame relay network interface card installed along with the appropriate software.

Some endpoint devices, such as conventional routers, are shared by more than one originator. A router may receive information to transmit from a second originator before it has transmitted the information from a first originator. Because the frames from the two originators will share the same communication line from the router to the frame relay network, a conflict for the shared resource of the communication line can exist when more than one originator tries to use the endpoint device to send information. If the router can multitask, it can perform the routing and partitioning function while it transmits information from the first originator. However, because the communication line from the router to the network can only handle one frame at a time, the router will append the frames from the second originator into the queue for transmission at a later time, such as after the information from the first originator is transmitted into the network.

Some information is time-sensitive and therefore a simple first-in, first-out queue can cause the time sensitive information to be delayed longer than is acceptable. Such delay can produce undesirable results. For example, if the information sent to the router by the second originator described above is time sensitive, and the information sent to the router by the first originator is not time sensitive, the time sensitive information must wait until the non-time-sensitive information is fully transmitted.

Examples of time-sensitive information in a network are voice and video data. Voice data is time sensitive because the recipients may notice any delay in the conversation, and video data is time sensitive because, once started, any interruptions will be viewed as either "snow" or "jerky" motions. While some amount of delay is acceptable in both cases, the acceptable limit of the delay is finite and small. The acceptable delay can be exceeded due to a large data transmission behind which the time-sensitive information can be placed in the queue of the endpoint device. The acceptable delay is typically expressed in units of time, such as 50 milliseconds for voice data.

Some frame relay networks allow information to be prioritized in the queue. Time sensitive information received after non-time-sensitive information will nevertheless be framed, and those frames will be moved ahead in the queue of the endpoint device and transmitted into the network immediately, being delayed only for so long as to allow any partially transmitted frames to complete transmission.

In some circumstances, this delay to wait for partially transmitted frames to complete transmission can still be unacceptable if the time it takes to complete transmission of a partially transmitted frame exceeds the acceptable delay. The time it takes to complete transmission of any partially transmitted frame, referred to herein as transmission delay, is a function of the transmission speed of the endpoint device into the network and the number of remaining bits of the frame in the process of transmission when the time-sensitive information is received. In the worst case, the remaining number of bits is one less than the size of the frame.

One solution to this problem is to use an unshared endpoint device to transmit time-sensitive information. However, such a solution may be prohibitively expensive. Another potential solution is to obtain a very fast endpoint device and connection into the network for which the transmission delay for frames which are even the maximum allowable frame size would be below the acceptable delay. However, this solution may also be prohibitively expensive. Another potential solution is to immediately abort the transmission of the frame in process if time-sensitive information is received. However, such a solution would cause the recipient to request retransmission of the aborted frame, increasing the traffic on the network, potentially significantly. Another potential solution would be to reduce the frame size on the network so that, in all cases, the transmission delay will be less than the acceptable delay. However, the reduced frame size would mean an increased number of frames. Because each frame contains a certain amount of overhead in the header such as the routing information, the increased number of frames could significantly increase the network traffic.

It is desirable to allow originators of time-sensitive information to transmit frames within the acceptable delay using endpoint devices and network connections of any speed and that are shared with other information without significantly affecting traffic of a frame relay network.

SUMMARY OF THE INVENTION

A method and apparatus allows a two endpoint devices in communication to negotiate the size of frames to be sent in each direction between an originator and a recipient. Each endpoint device can receive an acceptable delay for each originating device that uses the endpoint device to send information over the frame relay network. The endpoint device uses the lowest of the acceptable delays and the speed of the line to calculate the maximum size frame it can send and receive in order to maintain delays below the lowest acceptable level. Each endpoint device then transmits the maximum frame size it calculates to other endpoint devices on the frame relay network from which it is capable of receiving frames. Each endpoint device on the network sends frames that are not larger than the lower of the sending endpoint device's maximum frame size and the receiving endpoint device's maximum frame size.

The resulting frames are the largest size that will not exceed an acceptable level of delay for either the sending or receiving device, minimizing the network traffic impact without exceeding the acceptable delay of the sending and receiving endpoint device. The frame sizes are tailored to the needs of each pair of endpoint devices: endpoint devices in communication for which the maximum possible delay is acceptable can use the maximum allowable frame size for the network, such as 4096 bytes. Other endpoint devices in communication will use a lower size frame, but not lower than necessary to ensure a delay not greater than the acceptable delay, minimizing the network traffic impact to that which is necessary to accommodate the needs of each device in communication.

BRIEF DESCRIPTION OF THE INVENTION

DETAILED DESCRIPTION OF A PREFERRED EMBODIMENT

The present invention may be implemented as computer software in an endpoint device. An endpoint device may be implemented as a conventional computer system.

Figure 1:
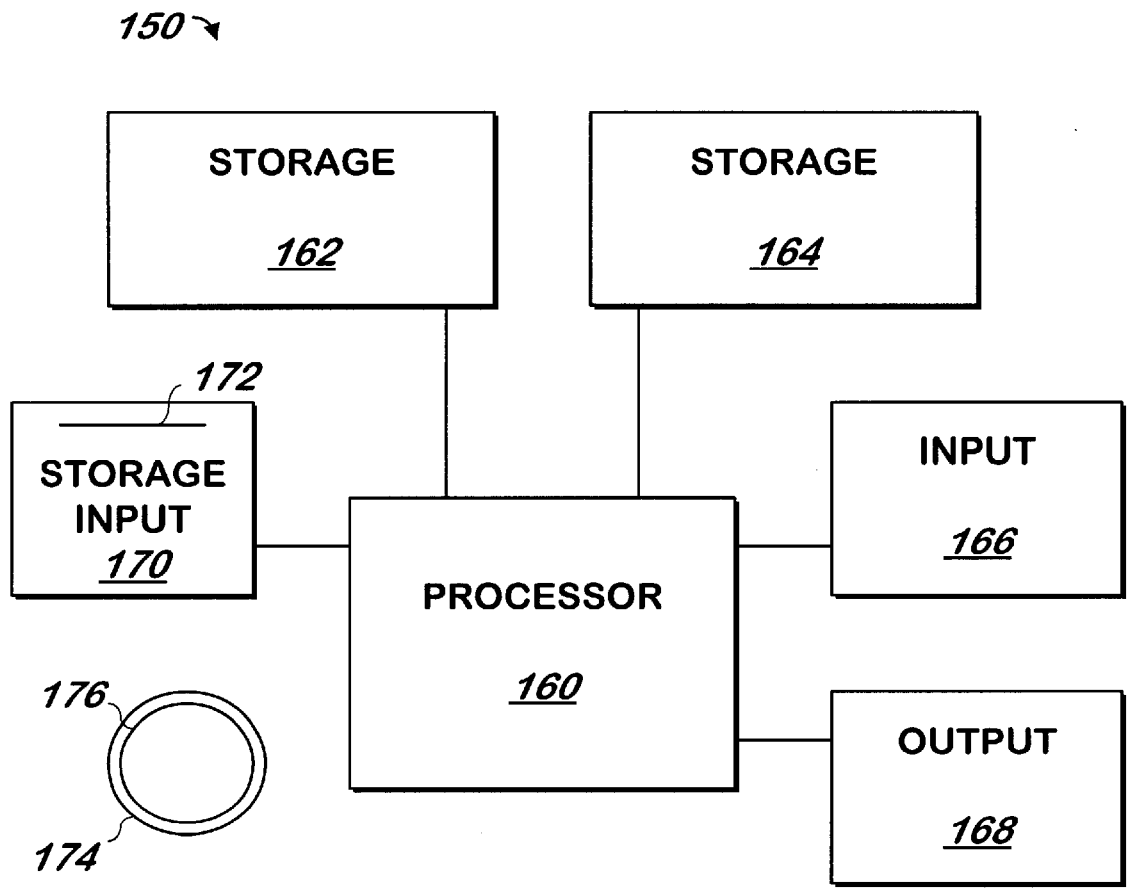
FIG. 1 is a block schematic diagram of a conventional computer system.

Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

Figure 2:
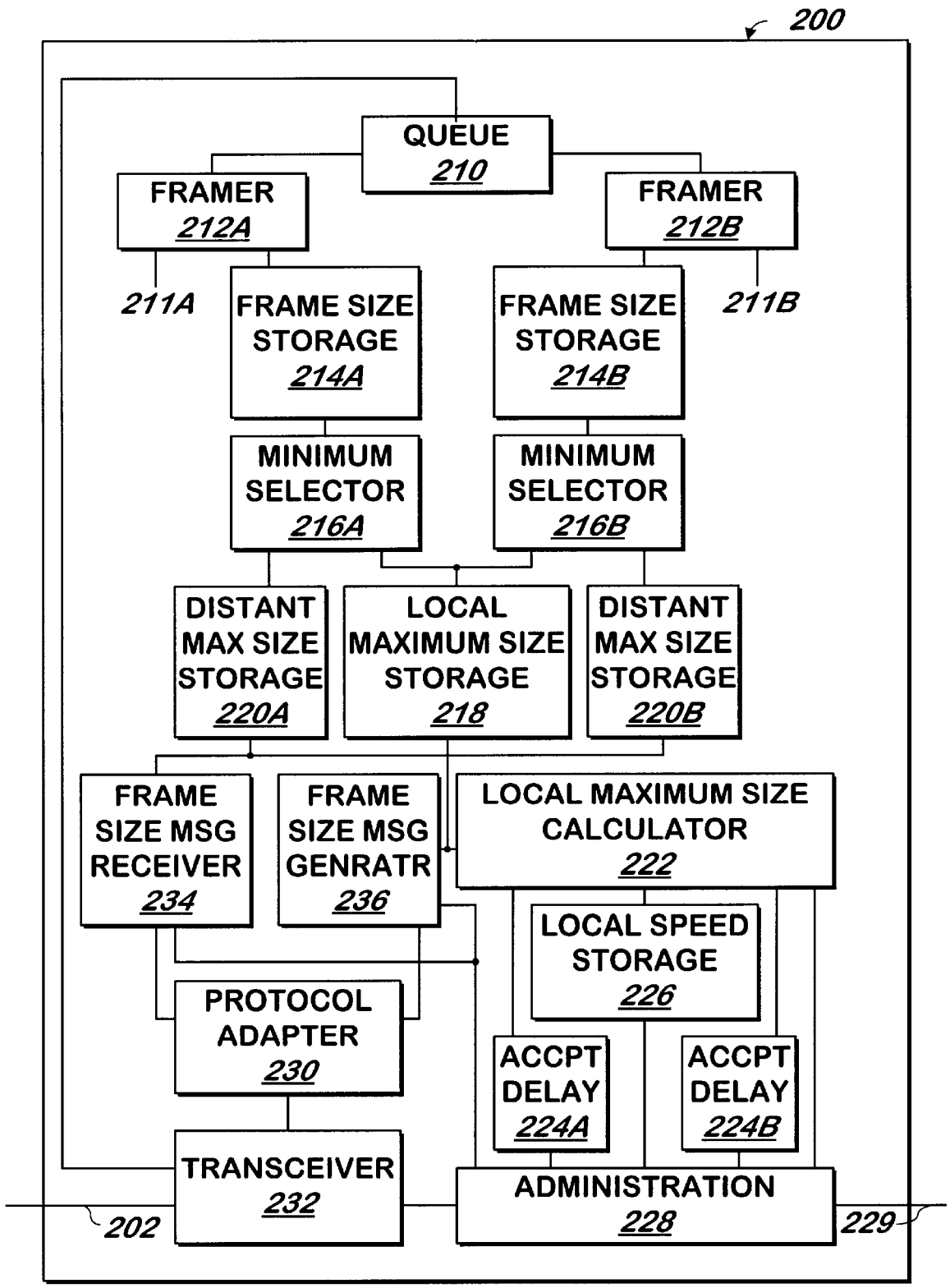
FIG. 2 is a block schematic diagram of an apparatus for identifying the frame size to be used to transmit information over either of two PVCs to prevent delay from exceeding one or more acceptable levels according to one embodiment of the present invention.

Referring now to FIG. 2, one embodiment of an apparatus that provides a frame size to avoid exceeding one or more acceptable delays is shown according to one embodiment of the present invention. Administration 228 receives from input 229 the acceptable delay, measured in units of time such as milliseconds, for each of two PVCs, PVC A and PVC B. The acceptable delay may be calculated to take into account any network delay. The apparatus shown in FIG. 2 accommodates two PVCs, however any number of PCs may be accommodated in other embodiments of the present invention. Administration 228 stores the acceptable delay received for PVC A in acceptable delay storage 224A and the acceptable delay for PVC-B in acceptable delay storage 224B. Administration 228 receives at input 229 the local speed, in a number of bits per second, such as kilobits per second, of the physical connection 202 used to carry the traffic for the PVCs. This local speed may be the speed of the transceiver 232 that transmits and receives information to and from the frame relay network over communications line 202, the speed of a switch to which the line 202 is connected, or any other speed. Administration 228 stores the local speed received in local speed storage 226. A single physical connection 202 is shown in FIG. 2, although any number of physical interfaces 202 may be accommodated by the present invention.

Local maximum size calculator 222 calculates the maximum frame size that may be transmitted or received without exceeding either of the two acceptable delays stored in acceptable delay storage 224A, 224B. In one embodiment, the maximum frame size is calculated by selecting the minimum of the acceptable delays for all PVCs over which the endpoint device may communicate, and multiplying the selected delay by the speed of the line to produce a result having units of a number of bytes.

In one embodiment, local maximum size calculator 222 calculates the maximum frame size by identifying the smaller of the acceptable delays stored in acceptable delay storage 224A, 224B and multiplying the smallest acceptable delay identified with the speed of the physical connection 202 stored in local speed storage 226. In another embodiment, a constant value is subtracted from the result of this multiplication to accommodate the delay the endpoint device requires to calculate the route. The maximum frame size calculated is stored by local maximum size calculator 222 in local maximum size storage 218. If a new or different acceptable delay is received by administration 228, administration 228 signals local maximum size calculator 222 to recalculate and store in local maximum size storage 218 the maximum frame size.

The local maximum frame size is also passed by local maximum size calculator to frame size message generator 236. Frame size message generator 236 receives from administration 228 an identifier of each PVC defined to the endpoint device 200. These identifiers may be received via input 229 supplied by a person who manages the endpoint device or received automatically via transceiver 232 over the network. Either periodically or at the time of any change, frame size message generator 236 generates, for each PVC defined to administration 228, a message indicating the local maximum frame size, and an identifier of the PVC. Frame size message generator 236 passes the messages to protocol adapter 230, which adapts the frame size message into the protocol required to be transmitted to the other endpoint devices which can receive messages over the PVC specified in each of the messages. In one embodiment, protocol adapter 230 places the message into a conventional frame relay frame and marks the frame as a frame size message. The protocol used can be any protocol that allows the receiving device to determine that the message is management information intended for the endpoint device, such as the protocol described in copending application Ser, No. 08/672,674, entitled "Autosensing LMI Protocols in Frame Relay Networks" filed on Jun. 28, 1996 by Shankar Natarajan and Gregory Fowler and having the same assignee as the present invention, which is incorporated by reference herein in its entirety.

Transceiver 232 transmits the frame size message over the PVCs to the frame relay network to be delivered to the other endpoint devices with which the endpoint device 200 communicates. In one embodiment, if no maximum acceptable delay is defined for any PVC, no frame size message is generated and transmitted by the endpoint device 200. In another embodiment, if the frame size in the frame size message would be larger than a certain threshold, such as 1600, 4096 or a maximum allowable frame size for the network, frame size message generator 236 does not produce such frame size messages and therefore no frame size message is generated and transmitted by the endpoint device 200.

Transceiver 232 receives frame size messages from other endpoint devices. In one embodiment, the frame sizes received are calculated by different endpoint devices as described above, using acceptable delays and speeds applicable to each other endpoint device. Transceiver 232 passes such messages to protocol adapter 230, which decodes them using the protocol described above and passes them to frame size message receiver 234. Frame size message receiver 234 identifies the frame size contained in each frame size message, and identifies whether such a maximum frame size corresponds to PVC-A or PVC-B using the PVC identifier contained in each frame size message and the PVCs defined to administration 228. Frame size message receiver 234 stores in distant maximum size storage 220A, 220B the frame size received for PVC-A and PVC-B, respectively.

In one embodiment, more than one frame size may be received for a PVC. Such embodiment might be useful where many devices share the same PVC. Frame size message receiver 234 compares a frame size received with any frame size stored in the distant maximum size storage 220A, 220B for that PVC, and stores the frame size received only if it is below the size stored in the corresponding distant maximum size storage 220A, 220B. In such embodiment, some or all of the frame size messages contain an indicator to allow only the endpoint device that sent the frame size message having the smallest frame size to adjust it upward should conditions warrant.

Minimum selector 216A selects a minimum of the distant maximum size storage 220A or the local maximum size storage 218 and stores the result in frame size storage 214A. Minimum selector 216B selects a minimum of the distant maximum size storage 220B or the local maximum size storage 218 and stores the result in frame size storage 214B. In one embodiment, a single minimum selector takes the place of the two minimum selector s 216A, 216B by selecting the minimum frame size of PVC-A and PVC-B one PVC at a time, and storing the result in the appropriate one of frame size storage 214A, 214B.

In one embodiment, at startup of the endpoint device, administration 228 initializes local maximum size storage 218 and distant maximum size storage 220A, 220B with the value of the largest possible frame size. The connections to administration 228 are not shown to avoid cluttering the Figure. In this manner, if no acceptable delay is defined or a distant maximum size is not received, it will not impact the size calculation performed by minimum selector 216.

When information is received for segmenting by conventional frame relay framers 212A, 212B via inputs 211A, 211B, conventional framers 212A, 212B will use the frame sizes stored in their respective frame size storage 214A, 214B as a maximum size to size the frames of the information to be transmitted over PVC-A and PVC-B, respectively. Framers 212A, 212B, such as conventional frame relay assemblers/disassemblers, segment the information received from an originator. Additionally, framers 212A, 212B add the conventional frame relay frame header and trailer information and pass the frames to conventional frame relay queue 210. The functions of framers 212A, 212B are described in Smith, "Frame Relay: Principles and Applications (1993 Addison Wesley, ISBN 0-201-62400-1). In one embodiment, the functions of framers 212A, 212B may be combined into a single framer which frames by selecting one of the maximum sizes stored in frame size storage 214A, 214B based upon the destination of the information specified by the originator. Frame relay queue 210 queues the frames, using the conventional priority capability described above, and sends them one at a time to transceiver 232 for transmission to the frame relay network over communications line 202 to one or more remote endpoint devices.

Figure 3:
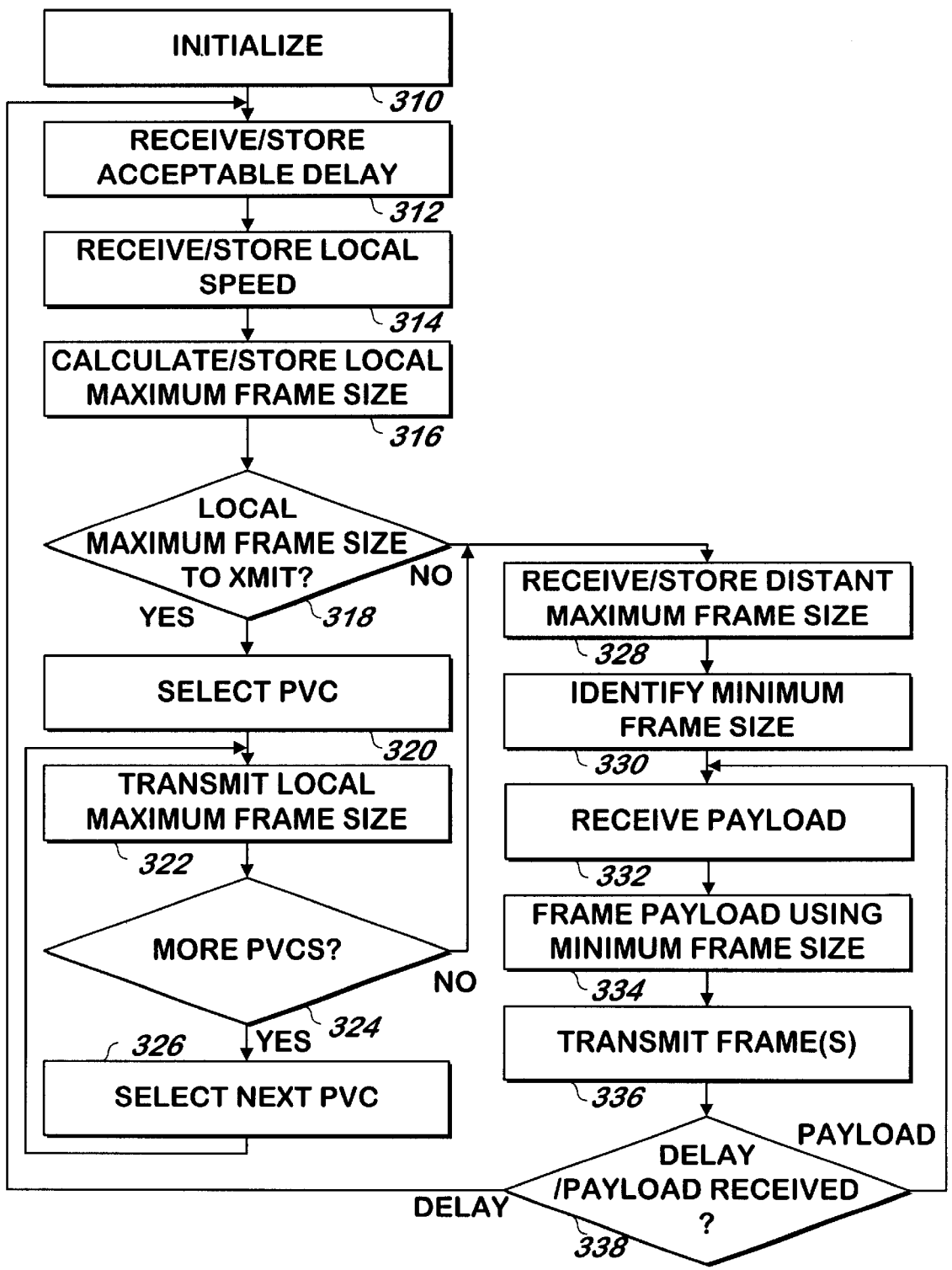
FIG. 3 is a flowchart illustrating a method of identifying the frame size to be used to transmit information over each of at least one PVC to prevent delay from exceeding one or more acceptable levels according to one embodiment of the present invention.

Referring now to FIG. 3, a method of selecting a frame size is shown according to one embodiment of the present invention. Local and distant maximum frame sizes are initialized 310 to the maximum allowable frame size allowed for the network in one embodiment, and a smaller number in another embodiment. One or more acceptable delays are received and stored 312. In one embodiment, only the lowest value delay is stored in step 312, and in another embodiment, all delays received are stored. A local speed is received and stored 314. The local speed is a speed of communication in one embodiment, which may be equal to a maximum transmission speed of an endpoint device, the maximum speed of transmission of the transmission line coupled to an endpoint device, the maximum speed of reception of a device such as a switch that is coupled to an endpoint device, or any other speed.

The local maximum frame size is calculated 316 as described above by multiplying the delay by the frame size in one embodiment, or multiplying the delay by the frame size and subtracting a constant number from the result. In one embodiment, if more than one acceptable delay is received, the local maximum frame size is calculated as described above using the delay received in step 312 representing the smallest delay.

If the local maximum size calculated in step 316 is above a threshold, it does not need to be transmitted in one embodiment 318. The threshold may be the maximum allowable frame size for a network in one embodiment, or a different number in another embodiment. If the local maximum size exceeds the threshold, the method continues at step 328, otherwise the method of the present invention continues at step 320.

A PVC is selected 320. In one embodiment, the PVC selected in step 320 is selected from a list of PVCs. The local maximum frame size calculated in step 316 is transmitted 322 to one or more endpoint devices that communicate using the PVC selected in step 320 as described above. If there are additional PVCs 324, for example additional PVCs on the list of PVCs described above, another PVC is selected 326 and the method continues at step 322 until the local maximum frame size is transmitted using some or all the PVCs on the list.

One or more distant maximum frame sizes are received and stored 328. In one embodiment, these frame sizes received are calculated using steps similar or identical to 310–322, using acceptable delays and speeds applicable to remote devices. In one embodiment, in step 318, the minimum frame size is stored associated with a PVC, and in one such embodiment, an identifier of the PVC with which to associate the distant maximum frame size is received with the frame size as a part of step 328. The minimum of the frame size received in steps 316, 328 is identified 330, and associated with the PVC with which the distant maximum frame size received in step 328 is associated. The order of steps 318–326 relative to steps 328 and 330 need not be as shown in FIG. 3.

A payload of information is received 332 and framed 334 using conventional framing techniques described above using the minimum of the maximum frame size identified in step 330. In one embodiment, the payload received in step 332 corresponds to a PVC, either implicitly or explicitly using an identifier associated with the PVC. The minimum frame size used to frame the payload in step 334 is the minimum frame size associated with that PVC. The frames of the payload framed in this step 334 are then transmitted 336 over a frame relay network until a new payload is received or a new acceptable delay is received.

If a new acceptable delay is received 338, the method continues at step 312, and if a payload is received 338, the method continues at step 332. In one embodiment, if a new delay is received during the transmission of the frames of a payload, the steps beginning at step 312 are not taken until all the frames of any such payloads are transmitted. In another embodiment, if a new delay is received during the transmission of the frames of a payload, the steps beginning at step 312 are taken immediately, and steps 332 and 334 are skipped immediately following step 330.

What is claimed is:

1. An apparatus for identifying at least one frame size, comprising a local maximum frame size calculator having:
   at least one acceptable delay input, each operatively coupled to receive at least one acceptable delay;
   a local speed input operatively coupled to receive a local speed; and wherein
      the local maximum frame size calculator for selecting a minimum acceptable delay from at least one of the at least one acceptable delay received at the at least one acceptable delay input and for calculating and providing to an output a result comprising a first frame size comprising the product of the minimum acceptable delay selected and the local speed received at the local speed input.

2. The apparatus of claim 1, additionally comprising:
   a frame size message generator having an input coupled to the local maximum frame size calculator for generating and providing at an output at least one frame size message responsive to the frame size received at the frame size message generator input; and
   a frame relay transceiver having a first input/output coupled to the frame size message generator output to receive a message corresponding to the frame size message and for transmitting at a second input/output coupled to a frame relay network the message received at the frame relay transceiver first input/output.

3. The apparatus of claim 2, additionally comprising:
   at least one acceptable delay storage for receiving at an input, storing and providing at an output coupled to at least one of the at least one local maximum frame size calculator acceptable delay input, at least one of the acceptable delays; and
   a local speed storage for receiving a local speed at an input, storing, and providing at an output coupled to the local maximum frame size calculator local speed input, the local speed.

4. The apparatus of claim 2 wherein the result provided at the local maximum size calculator output comprises the product of the minimum acceptable delay selected and the local speed received at the local speed input less a number.

5. The apparatus of claim 2 wherein:
   the frame size message generator additionally has an administration input for receiving a plurality of PVC identifiers; and
   the frame size messages generated by the frame size message generator additionally comprise an indicator corresponding to at least one of the PVC identifiers received at the frame size message generator administration input.

6. The apparatus of claim 5 wherein at least one of the frame size messages comprises a PVC identifier unique from a remaining frame size message.

7. The apparatus of claim 1 wherein the apparatus is additionally for identifying a second frame size, the apparatus additionally comprising at least one minimum selector having a distant maximum size input operatively coupled to receive an indicator corresponding to a maximum frame size desired by a device coupled to the frame relay transceiver second input/output, and a local maximum size input coupled to the local maximum frame size calculator output, the minimum selector for selecting and providing at an output the second frame size comprising a lower of the maximum frame size corresponding to the indicator received at the distant maximum size input and the first frame size received at the local maximum size input.

8. The apparatus of claim 2 wherein:
   the apparatus is additionally for identifying a second frame size, the apparatus additionally comprising at least one minimum selector having a distant maximum size input operatively coupled to receive an indicator corresponding to a maximum frame size desired by a device coupled to the frame relay transceiver second input/output, and a local maximum size input coupled to the local maximum frame size calculator output, the minimum selector for selecting and providing at an output the second frame size comprising a lower of the maximum frame size corresponding to the indicator received at the distant maximum size input and the first frame size received at the local maximum size input; and
   the frame relay transceiver is additionally for receiving at the second frame relay input/output at least one received frame size message and providing a message corresponding to at least one of the received frame size messages received to the first frame relay transceiver input/output, the apparatus additionally comprising a frame size message receiver coupled between at least one of the minimum selector distant maximum size input and the frame relay transceiver first input/output for receiving at an input coupled to the frame relay transceiver the message corresponding to the frame size message and providing at an output coupled to at least one of the minimum selector distant maximum size input a frame size.

9. A method of communicating at least one frame size in a frame relay network, the method comprising:
   identifying a first frame size; and
   transmitting over the frame relay network a message having a size, said message responsive to the first frame size identified, wherein the first frame size is different from the size of the message; and
   wherein the identifying step comprises:
      receiving at least one acceptable delay;
      receiving a local speed; and
      calculating the first frame size responsive to the local speed received and at least one of the acceptable delays received.

10. The method of claim 9 wherein the calculating step is responsive to a lowest value acceptable delay received.

11. The method of claim 10 wherein the calculating step comprises multiplying the lowest value acceptable delay received by the local speed received.

12. The method of claim 11 wherein the calculating step additionally comprises subtracting a constant value.

13. A method of communicating at least one frame size in a frame relay network, the method comprising:
   identifying a first frame size;
   transmitting over the frame relay network a message having a size, said message responsive to the first frame size identified, wherein the first frame size is different from the size of the message;
   receiving a distant maximum frame size; and
   providing a second frame size comprising a minimum of the distant maximum frame size received and the first frame size identified.

14. The method of claim 13 wherein the distant maximum frame size is received over the frame relay network.

15. The method of claim 14 additionally for transmitting a frame, additionally comprising the steps of:
   receiving a payload;
   segmenting the payload into at least one frame relay frame not larger than the second frame size; and
   transmitting the frame relay frames segmented over the frame relay network.

16. The method of claim 15 comprising the additional step of initializing the first frame size and the second frame size.

17. A computer program product comprising a computer useable medium having computer readable program code embodied therein for communicating at least one frame size in a frame relay network, the computer program product comprising:
   computer readable program code devices configured to cause a computer to identify a first frame size: and
   computer readable program code devices configured to cause a computer to transmit over the frame relay network a message having a size, said message responsive to the first frame size identified, wherein the first frame size is different from the size of the message; and
   wherein the computer readable program code devices configured to cause a computer to identify comprise:
      computer readable program code devices configured to cause a computer to receive at least one acceptable delay;
      computer readable program code devices configured to cause a computer to receive a local speed; and
      computer readable program code devices configured to cause a computer to calculate the first frame size responsive to the local speed received and at least one of the acceptable delays received.

18. The computer program product of claim 17 wherein the computer readable program code devices configured to cause a computer to calculate are responsive to a lowest value acceptable delay received.

19. The computer program product of claim 18 wherein the computer readable program code devices configured to cause a computer to calculate comprise computer readable program code devices configured to cause a computer to multiply the lowest value acceptable delay received by the local speed received.

20. The computer program product of claim 19 wherein the computer readable program code devices configured to cause a computer to calculating additionally comprises computer readable program code devices configured to cause a computer to subtract a constant value.

21. A computer program product comprising a computer useable medium having computer readable program code embodied therein for communicating at least one frame size in a frame relay network, the computer program product comprising:
   computer readable program code devices configured to cause a computer to identify a first frame size;
   computer readable program code devices configured to cause a computer to transmit over the frame relay network a message having a size, said message responsive to the first frame size identified, wherein the first frame size is different from the size of the message;
   computer readable program code devices configured to cause a computer to receive a distant maximum frame size; and
   computer readable program code devices configured to cause a computer to provide a second frame size comprising a minimum of the distant maximum frame size received and the first frame size identified.

22. The computer program product of claim 21 wherein the distant maximum frame size is received over the frame relay network.

23. The computer program product of claim 22 additionally for transmitting a frame, additionally comprising:
   computer readable program code devices configured to cause a computer to receive a payload;
   computer readable program code devices configured to cause a computer to segment the payload into at least one frame relay frame not larger than the second frame size; and
   computer readable program code devices configured to cause a computer to transmit the frame relay frames segmented over the frame relay network.

24. The computer program product of claim 23 additionally comprising computer readable program code devices configured to cause a computer to initialize the first frame size and the second frame size.

25. A method of identifying a first frame size, comprising:
   receiving at least one acceptable delay;
   receiving a local speed; and
   calculating the first frame size responsive to the local speed received and at least one of the acceptable delays received and a lowest value acceptable delay received; and
   wherein the calculating step comprises:
      multiplying the lowest value acceptable delay received by the local speed received; and
      subtracting a constant value.

26. A method of identifying a first frame size, comprising:

receiving at least one acceptable delay;

receiving a local speed;

calculating the first frame size responsive to the local speed received and at least one of the acceptable delays received;

receiving a distant maximum frame size; and providing a second frame size comprising a minimum of the distant maximum frame size received and the first frame size identified.

27. The method of claim 26 wherein the distant maximum frame size is received over a frame relay network.

28. The method of claim 27 additionally for transmitting a frame, additionally comprising the steps of:

receiving a payload;

segmenting the payload into at least one frame relay frame not larger than the second frame size; and transmitting the frame relay frames segmented over the frame relay network.

29. The method of claim 28 comprising the additional step of initializing the first frame size and the second frame size.

30. A computer program product comprising a computer useable medium having computer readable program code embodied therein for identifying a first frame size, comprising:

computer readable program code devices configured to cause a computer to receive at least one acceptable delay;

computer readable program code devices configured to cause a computer to receive a local speed; and computer readable program code devices configured to cause a computer to calculate the first frame size responsive to the local speed received and at least one of the acceptable delays received and a lowest value acceptable delay received; and wherein the computer readable program code devices configured to cause a computer to calculate comprise:

computer readable program code devices configured to cause a computer to multiply the lowest value acceptable delay received by the local speed received; and computer readable program code devices configured to cause a computer to subtract a constant value.

31. A computer program product comprising a computer useable medium having computer readable program code embodied therein for identifying a first frame size, comprising:

computer readable program code devices configured to cause a computer to receive at least one acceptable delay;

computer readable program code devices configured to cause a computer to receive a local speed;

computer readable program code devices configured to cause a computer to calculate the first frame size responsive to the local speed received and at least one of the acceptable delays received;

computer readable program code devices configured to cause a computer to receive a distant maximum frame size; and computer readable program code devices configured to cause a computer to provide a second frame size comprising a minimum of the distant maximum frame size received and the first frame size identified.

32. The computer program product of claim 31 wherein the distant maximum frame size is received over a frame relay network.

33. The computer program product of claim 32 additionally for transmitting a frame, additionally comprising:

computer readable program code devices configured to cause a computer to receive a payload;

computer readable program code devices configured to cause a computer to segment the payload into at least one frame relay frame not larger than the second frame size; and computer readable program code devices configured to cause a computer to transmit the frame relay frames segmented over the frame relay network.

34. The computer program product of claim 33 additionally comprising computer readable program code devices configured to cause a computer to initialize the first frame size and the second frame size.

* * * * *